US009363473B2

(12) United States Patent
Zhao et al.

(10) Patent No.: US 9,363,473 B2
(45) Date of Patent: Jun. 7, 2016

(54) VIDEO ENCODER INSTANCES TO ENCODE VIDEO CONTENT VIA A SCENE CHANGE DETERMINATION

(71) Applicant: Intel Corporation, Santa Clara, CA (US)

(72) Inventors: Bo Zhao, Beijing (CN); Yunbiao Lin, Shanghai (CN); Yue Xiong, Shanghai (CN)

(73) Assignee: Intel Corporation, Santa Clara, CA (US)

(*) Notice: Subject to any disclaimer, the term of this patent is extended or adjusted under 35 U.S.C. 154(b) by 335 days.

(21) Appl. No.: 13/976,095

(22) PCT Filed: Dec. 17, 2012

(86) PCT No.: PCT/CN2012/086760

§ 371 (c)(1),
(2) Date: Jun. 26, 2013

(87) PCT Pub. No.: WO2014/094204

PCT Pub. Date: Jun. 26, 2014

(65) Prior Publication Data

US 2014/0198851 A1 Jul. 17, 2014

(51) Int. Cl.

| | |
|---|---|
| ***H04N 19/577*** | (2014.01) |
| ***H04N 7/15*** | (2006.01) |
| ***H04N 19/172*** | (2014.01) |
| ***H04N 19/107*** | (2014.01) |
| ***H04N 19/137*** | (2014.01) |

(Continued)

(52) U.S. Cl.
CPC .............. *H04N 7/15* (2013.01); *H04N 19/107* (2014.11); *H04N 19/137* (2014.11); *H04N 19/142* (2014.11); *H04N 19/172* (2014.11); *H04N 19/194* (2014.11); *H04N 19/436* (2014.11)

(58) Field of Classification Search
CPC ..... H04N 7/15; H04N 19/107; H04N 19/137; H04N 19/142; H04N 19/172; H04N 19/194; H04N 19/436
See application file for complete search history.

(56) References Cited

U.S. PATENT DOCUMENTS 5,978,029 A * 11/1999 Boice .................. H04N 19/176 375/240.14
6,100,940 A * 8/2000 Dieterich .............. H04N 19/46 348/700

(Continued)

FOREIGN PATENT DOCUMENTS

CN 1842162 A 10/2006
CN 101171843 A 4/2008

OTHER PUBLICATIONS

International Search Report and Written Opinion received for PCT Patent Application No. PCT/CN2012/086760 mailed on Sep. 19, 2013, 11 pages.

*Primary Examiner* — Jay Patel
*Assistant Examiner* — Joseph Suh
(74) *Attorney, Agent, or Firm* — Jordan IP Law, LLC

(57) ABSTRACT

Methods and systems may provide for invoking instances of a hardware video encoder, wherein the instances include a first encoder instance and a second encoder instance. Additionally, the first encoder instance may be used to make a scene change determination and a motion level determination with respect to the video content. In one example, the second encoder instance is used to encode the video content based on the scene change determination and the motion level determination.

30 Claims, 5 Drawing Sheets

(51) Int. Cl.
*H04N 19/142* (2014.01)
*H04N 19/194* (2014.01)
*H04N 19/436* (2014.01)

(56) References Cited

U.S. PATENT DOCUMENTS 6,731,685 B1 * 5/2004 Liu .................. H04J 3/1688 348/385.1
7,170,938 B1 * 1/2007 Cote .................. H04N 19/176 375/240.03
8,351,343 B1 * 1/2013 Schmalz .............. H04W 24/02 370/252
2002/0012395 A1 * 1/2002 Song .................. H04N 19/197 375/240.03
2002/0067768 A1 * 6/2002 Hurst .............. H04N 21/23406 375/240.03
2003/0035484 A1 * 2/2003 Prakash .................. G06T 9/001 375/240.25
2003/0184453 A1 * 10/2003 Hall .................. H04M 7/30 341/51
2003/0217957 A1 * 11/2003 Bowman, Jr. ........... A61M 1/28 210/232
2005/0226524 A1 * 10/2005 Komiya ............. G06K 9/00711 382/254
2006/0045179 A1 * 3/2006 Mizuno ............ G11B 20/00086 375/240.01
2006/0045180 A1 * 3/2006 Ghanbari .......... H04L 29/06027 375/240.03
2006/0045181 A1 * 3/2006 Chen .................. H04N 19/117 375/240.12
2006/0050789 A1 * 3/2006 Gisquet ................ H04N 19/172 375/240.23
2006/0072832 A1 * 4/2006 Nemiroff ............. H04N 19/172 382/232
2006/0140273 A1 * 6/2006 Wu .................. H04N 19/172 375/240.16
2007/0030894 A1 * 2/2007 Tian .................. H04N 19/176 375/240.02
2007/0242748 A1 * 10/2007 Mahadevan ............ H04N 19/85 375/240.14
2007/0271480 A1 * 11/2007 Oh .................. G10L 19/005 714/3
2008/0025387 A1 * 1/2008 Lim .................. H04N 7/185 375/240.01
2008/0212886 A1 * 9/2008 Ishii .................. H04N 19/105 382/239
2008/0260278 A1 * 10/2008 Zuo .................. H04N 19/176 382/251
2008/0285649 A1 * 11/2008 Keesen ................ H04N 19/176 375/240.16
2009/0262867 A1 * 10/2009 Wan .................. G11B 27/3027 375/340
2010/0118938 A1 * 5/2010 Fuchs .................. H04L 65/607 375/240.12
2010/0309987 A1 * 12/2010 Concion ................ H04N 5/772 375/240.26
2011/0161517 A1 * 6/2011 Ferguson ........... H04N 7/17318 709/231
2012/0002716 A1 * 1/2012 Antonellis ........... H04N 19/139 375/240.01
2012/0136657 A1 * 5/2012 Shirakawa .......... G10L 19/0204 704/229
2012/0289788 A1 * 11/2012 Jain .................. G06F 19/3418 600/301
2013/0034146 A1 * 2/2013 Jeong .................. H04N 7/147 375/240.01
2013/0034151 A1 * 2/2013 Zhou .................. H04N 19/42 375/240.03
2013/0185084 A1 * 7/2013 Rajendran ............... G10L 19/04 704/500

* cited by examiner

FIG. 1
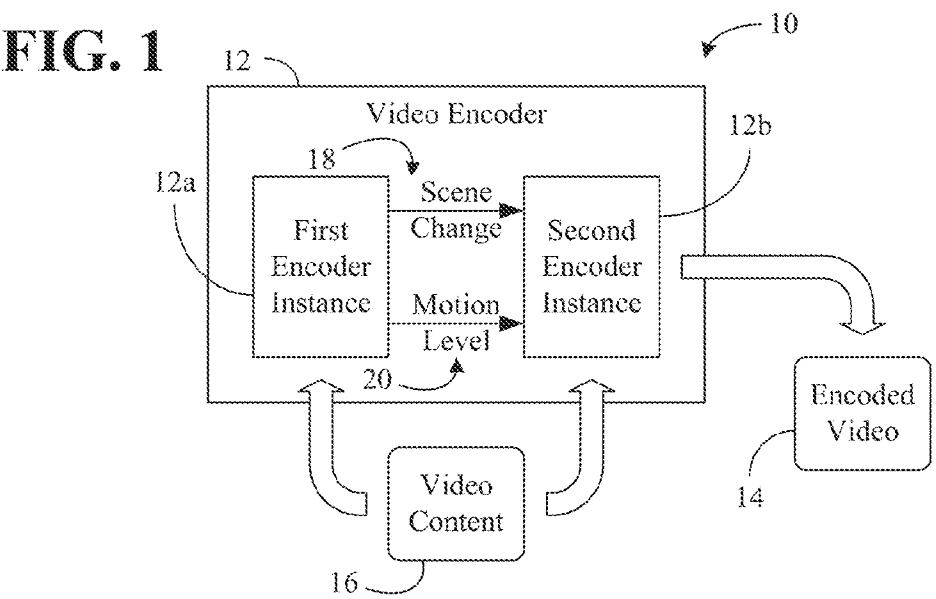
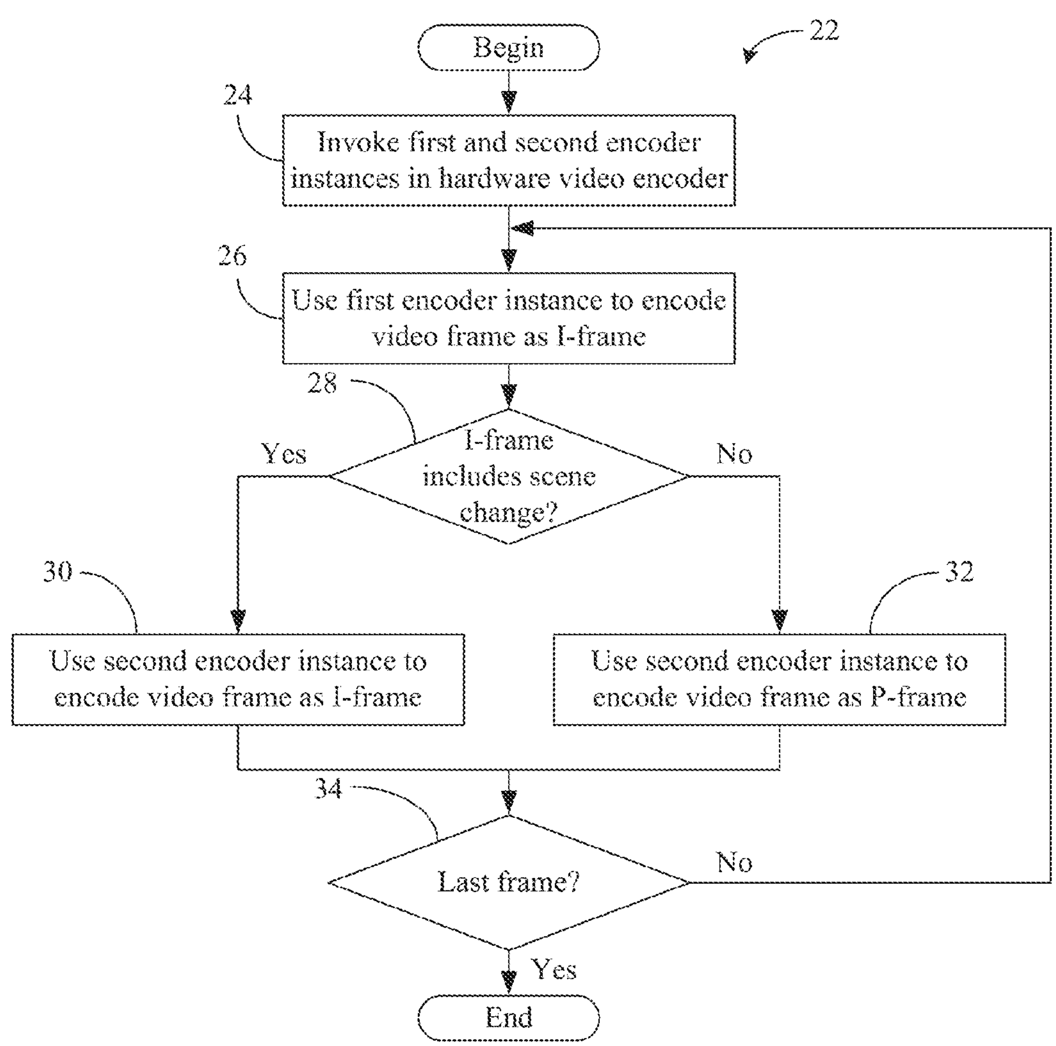
FIG. 2

VIDEO ENCODER INSTANCES TO ENCODE VIDEO CONTENT VIA A SCENE CHANGE DETERMINATION

BACKGROUND

In video encoding, different types of frame encoding schemes may be used in order to improve coding efficiency (e.g., obtain the best video quality at a specific hit rate). For example, advanced video encoders may select between the use of intra coded frames (I-frames), inter-prediction coded frames (P-frames) and bi-directional inter-prediction coded frames (B-frames), based on factors such as the existence of scene changes and/or significant amounts of motion in the underlying video content. Pre-processing the video content may involve the detection of scene changes and the level of motion, wherein conventional solutions may perform the pre-processing in either programmable software or fixed functionality hardware. In software based video preprocessing solutions, performance and power efficiency may be poor due to the complexity involved with scene change detection and motion level detection at high frame rates, particularly for mobile devices. Although hardware accelerated video pre-processing solutions may achieve better performance and power efficiency, the silicon area involved in implementing those solutions may increase significantly due again to the complexity involved with scene change and motion level detection. Such an increase in silicon area may be cost prohibitive in competitive computing platform industries.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is a block diagram of an example of a video encoding architecture according to an embodiment;

FIG. 2 is a flowchart of an example of a method of encoding video in low delay applications according to an embodiment;

DETAILED DESCRIPTION

Figure 3:
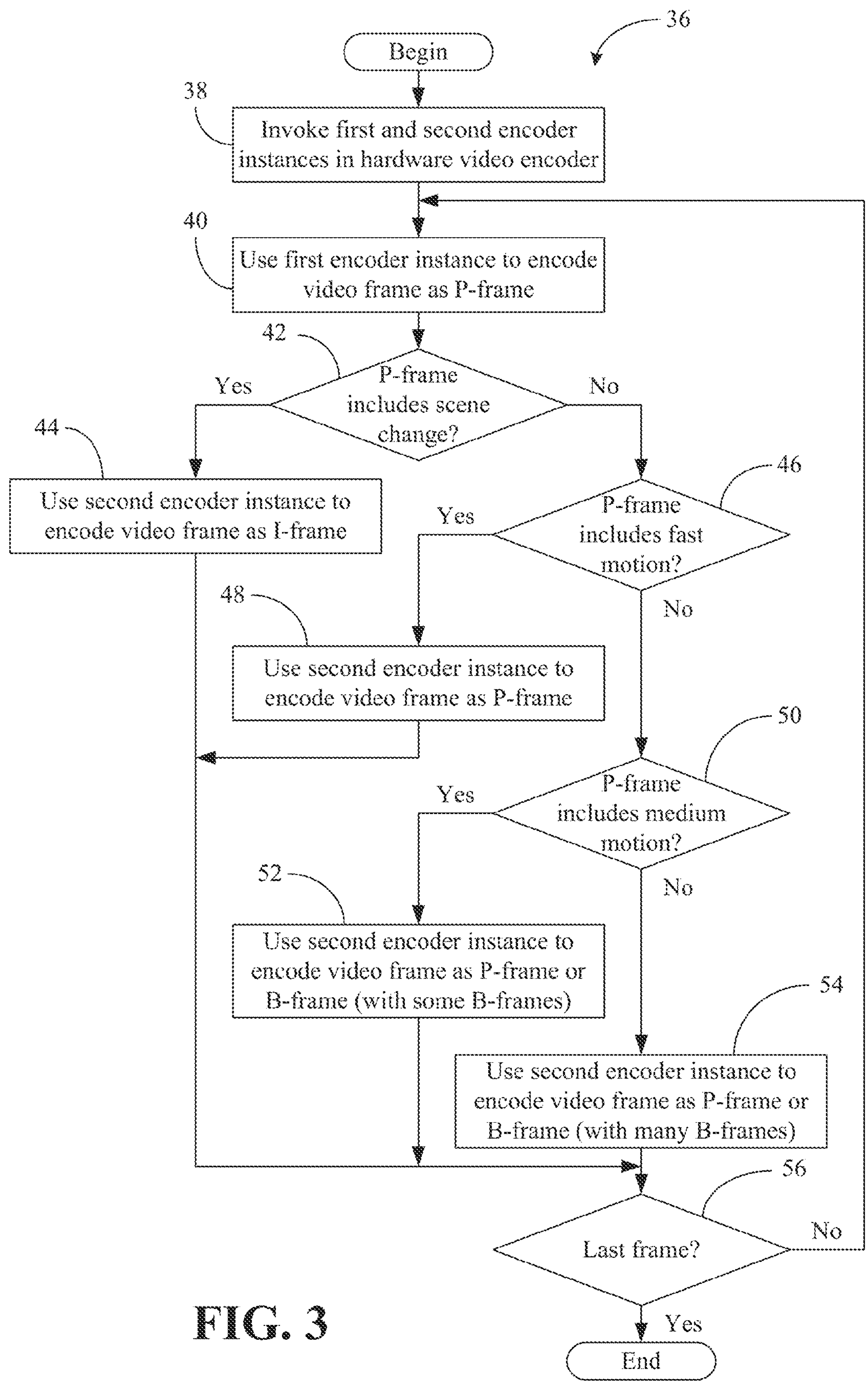
FIG. 3 is a flowchart of an example of a method of encoding video in storage applications according to an embodiment.

Embodiments may include a video encoder having a first encoder instance to make a scene change determination with respect to video content. The video encoder may also have a second encoder instance to encode the video content based on the scene change determination.

Embodiments can also include a system having a battery to supply power to the system and a video encoder with a first encoder instance to make a scene change determination with respect to video content. The video encoder may also include a second encoder instance to encode the video content based on the scene change determination.

Embodiments may also include a method that involves invoking a plurality of parallel instances of a hardware video encoder, wherein the plurality, of parallel instances includes a first encoder instance and a second encoder instance. The method may also provide for using the first encoder instance to make a scene, change determination with respect to video content and to make a motion level determination with respect to the video content. In addition, the method may involve using the second encoder instance to encode the video content based on the scene change determination and the motion level determination.

Embodiments may also include a computer readable storage medium having a set of instructions which, if executed by a processor, cause a computer to invoke a plurality of parallel instances of a hardware video encoder, wherein the plurality of parallel instances is to include a first encoder instance and a second encoder instance. The instructions, if executed, may also use the first encoder instance to make a scene change determination with respect to video content, and use the second encoder instance to encode the video content based on the scene change determination.

Turning now to FIG. 1, a video encoding architecture 10 is shown in which a hardware video encoder 12 (12*a*, 12*b*) generates encoded video 14 based on video content 16. The video content 16 may be generated by an image capture device and/or video application such as, for example, a video conferencing application, a video streaming application, a camcorder application, a video editing application, a gaming application, and so forth. The encoded video 14 may therefore be used for a wide variety of purposes such as, for example, wired or wireless transmission, local storage, etc., wherein the encoding process may reduce the amount of data to be transmitted and/or stored.

In the illustrated example, the hardware video encoder 12 includes a plurality of parallel instances that may be used to enhance performance, improve power efficiency, extend battery life, and so forth, without increasing the amount of semiconductor real estate (e.g., silicon area) dedicated to the video encoding process. More particularly, a first encoder instance 12*a* may be used to make scene change determinations 18 and motion level determinations 20 with respect to the video content 16. A second encoder instance 12*b* may be used to encode (e.g., compress) the video content 16 based on the scene change determinations 18 and the motion level determinations 20. Of particular note is that the illustrated architecture 10 uses an additional instance of the hardware video encoder 12 to conduct video pre-processing. Accordingly, the architecture 10 may provide greater performance and more power efficiency than conventional software based pre-processing solutions, and may occupy significantly less silicon area than conventional hardware accelerated pre-processing solutions.

FIG. 2 shows a method 22 of encoding video in low delay applications such as, for example, video conferencing and/or video streaming applications. The method 22 may be implemented in executable software as a set of logic instructions stored in a machine- or computer-readable storage medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as Java, Smalltalk, C++ or the like and conventional procedural programming languages, such as the "C" programming language or similar programming languages.

Illustrated processing block 24 provides for invoking a plurality of parallel instances of a hardware video encoder, wherein the plurality of parallel instances includes a first encoder instance and a second encoder instance. The first encoder instance may be used at block 26 to encode a video frame as an intra coded frame (I-frame). In this regard, I-frame encoding uses predictions that are constrained within the frame (i.e., predictions do not reference other frames). Thus, while I-frame encoding may be relatively inefficient from a coding standpoint due to the use of more bits to express video information, it may be particularly useful for pre-processing in video applications that have a relatively low delay tolerance (e.g., streaming and/or conferencing applications) due to the speed at which I-frame encoding may be conducted. A determination may be made at block 28 as to whether the encoded I-frame includes a scene change.

Scene Change—Encoded Bit Difference

In one example, the encoded bit difference between frames may be used to determine whether a scene change has taken place. In particular, the video frame may be encoded by the first encoder instance as an I-frame with a constant quantization parameter (i.e., no bit rate control). In general, video encoders may employ discrete cosine transform (DCT) coefficients, which may in turn enable the video content to be monitored, analyzed and controlled in the frequency domain. The quantization parameter (QP) of a video encoding system can establish the step size for associating the DCT coefficients with a finite set of steps. Thus, large values of QP may represent relatively large steps that roughly approximate the spatial transform, so that most of the signal can be captured by only a few coefficients. Small values of QP, on the other hand, can more accurately approximate the spatial frequency spectrum, but at the cost of more bits. Using a constant QP may therefore enable the number of encoded bits to be used as a metric for determining whether a scene change has taken place.

For example, if the number of encoded bits for frame n is $B_{(n)}$ and the number of encoded bits for frame n+1 is $B_{(n+1)}$, then frame n+1 can be detected as a scene change frame if:

$$|B_{(n+1)}-B_{(n)}|\geq T_{sc}*N \qquad (1)$$

Where | | is the absolute delta, $T_{sc}$ is a scene change threshold, and N is the total number of pixels in the video frame. Thus, the total pixel value (N) of one or more frames in the video content may be adjusted based on the scene change threshold ($T_{sc}$) to obtain an adjusted pixel value ($T_{sc}$*N), wherein a comparison is then conducted between the encoded bit difference associated with two or more frames in the video content and the adjusted pixel value to determine whether a scene change is present in the video content.

The scene change threshold, which can be determined based on the quantization parameter of the first encoder instance and the type of video content (e.g., category), may be trained offline to obtain the best scene change detection accuracy. Additionally, the different scene threshold values can be used to generate a two-dimensional table that may be indexed by quantization parameter and video content category. The various categories that might be associated with the video content might include, but are not limited to, conference, sports, people, scenery, movie, flash, gaming, and so forth.

If it is determined at block 28 that a scene change is present, illustrated block 30 uses the second encoder instance to encode the video frame as an I-frame because other frames are not likely to provide accurate information on which to base predictions in the current frame. If, on the other hand, it is determined at block 28 that a scene change is not present, illustrated block 32 uses the second encoder instance to encode the video frame as a P-frame, which has more coding efficiency than an I-frame and is likely to yield accurate results based on information from other frames. Block 34 may determine whether the last frame has been encountered in the video content. If so, the method 22 may terminate. Otherwise, the method 22 may repeat for remaining frames in the video content.

Turning now to FIG. 3, a method 36 of encoding video in storage applications such as, for example, video editing and/or video recording applications, is shown. The method 36 may be implemented in executable software as a set of logic instructions stored in a machine- or computer-readable storage medium of a memory such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 38 provides for invoking a plurality of parallel instances of a hardware video encoder, wherein the plurality of parallel instances includes a first encoder instance and a second encoder instance. The first encoder instance may be used at block 40 to encode a video frame as a P-frame, which may be more coding efficient than an I-frame, as already noted. Because the application is a storage based application, any potential increase in encoding time associated with the use of a P-frame may be negligible. A determination may be made at block 42 as to whether the P-frame includes a scene change. The determination at block 42 can be conducted similarly as to the encoded bit difference-based determination at aforementioned block 28 (FIG. 2). Alternatively, block 42 might provide for using a more robust motion vector approach.

Scene Chance—Motion Vector

In another example, a more robust motion vector approach may be used. More particularly, an average motion vector for the inter coded macroblock (or block partition) may be defined as follows:

$$MV_{avg,n} = \frac{\sum_{i=1}^{N} |MV(n, i, x)| + |MV(n, i, y)|}{N} \qquad (2)$$

Wherein MV(n,i,x) is the horizontal motion vector for macroblock i in frame n, MV(n,i,y) is the vertical motion vector for macroblock i in frame n, and N is the number of macmblocks in frame n. Additionally, a scene change motion vector threshold may be defined as $TMV_{sc}$, wherein a scene change may be detected for frame n+1 as follows:

$$|MV_{avg,n+1}-MV_{avg,n}|\geq TMV_{sc} \qquad (3)$$

Thus, an average motion vector for one or more frames in the video content may be determined, wherein a comparison may be conducted between the average motion vector and the scene change motion vector threshold in order to determine whether a scene change has occurred. The encoded bit difference and motion vector approaches may also be combined, depending upon the circumstances.

If a scene change is detected, block 44 may use the second encoder instance to encode the video frame as an I-frame, as already discussed. If, on the other hand, it is determined at block 42 that a scene change is not present, illustrated block 46 determines whether the P-frame includes relatively fast motion. In this regard, the motion level determination at block 46 may be made in a number of different ways.

Motion Level—Encoded Bit Difference

As already discussed with regard to scene changes in low delay applications, the encoded bit difference may be a useful metric in determining the level of motion. In particular, one or more motion level thresholds (e.g., $T_{fast}$, $T_{medium}$) may be used to adjust a total pixel value of one or more frames in the video content to obtain an adjusted pixel value, wherein a comparison may be conducted between the encoded bit difference can be compared to the adjusted pixel value. For example, frame n+1 may be determined to contain fast motion if, $$T_{fast}*N \leq |B_{(n+1)}-B_{(n)}| < T_{sc}*N \quad (4)$$

Where N is the total number of pixels in the video frame. Additionally, the second encoder instance may select a P-frame and B-frame encoding scheme based on the motion level determination. Thus, if fast motion is detected at block 46, illustrated block 48 uses the second encoder instance to encode the video frame as a P-frame. Otherwise, a determination may be made at block 50 as to whether the P-frame from the first encoder instance includes medium motion. Similarly, frame n+1 may be determined to contain medium motion if, $$T_{medium}*N \leq |B_{(n+1)}-B_{(n)}| < T_{fast}*N \quad (5)$$

If medium motion is detected, block 52 may use the second encoder instance to encode the video frame as either a P-frame or a B-frame, wherein the number of B-frames may be kept relatively low (e.g., one B-frame after each P-frame). Frame n+1 may be determined to contain slow motion if, $$|B_{(n+1)}-B_{(n)}| < T_{medium}*N \quad (6)$$

If medium motion is not detected, block 54 may still use the second encoder instance to encode the video frame as either a P-frame or a B-frame, but with the number of B-frames being relatively high (e.g., two or more B-frames after each P-frame).

Motion Level—Motion Vector

A more robust alternative to determining motion level may be to use motion vector information. In particular, an average motion vector may be determined according to equation (2) above for one or more frames in the video content, wherein a comparison may be made between the average motion vector and one or more motion level thresholds (e.g., $TMV_{fast}$, $TMV_{medium}$) to detect the level of motion. Thus, frame n+1 may be determined at block 46 to contain fast motion if, $$TMV_{fast} \leq |MV_{arg,n+1}+MV_{avg,n}| < TMV_{sc} \quad (7)$$

Where $TMV_{fast}$ is a motion level threshold for fast motion. Additionally, frame n+1 may be determined at block 50 to contain medium motion if, $$TMV_{medium} \leq |MV_{avg,n+1}-MV_{avg,n}| < TMV_{fast} \quad (8)$$

Where TMVmedium is a motion level threshold for medium motion. Moreover, frame n+1 may be determined at block 50 to contain slow motion if, $$|MV_{avg,n+1}-MV_{avg,n}| < TMV_{medium}$$

Moreover, if the average motion vector for the macroblock is not available in the hardware video encoder, another approach may be to count the inter coded (e.g., P-frame and B-frame) macroblocks in order to determine the level of motion in the video content. Thus, a relatively high number of inter coded macroblocks may be indicative of more motion, in such an example.

Block 56 may determine whether the last frame has been encountered in the video content. If so, the method 36 may terminate. Otherwise, the method 36 may repeat for remaining frames in the video content.

Figure 4:
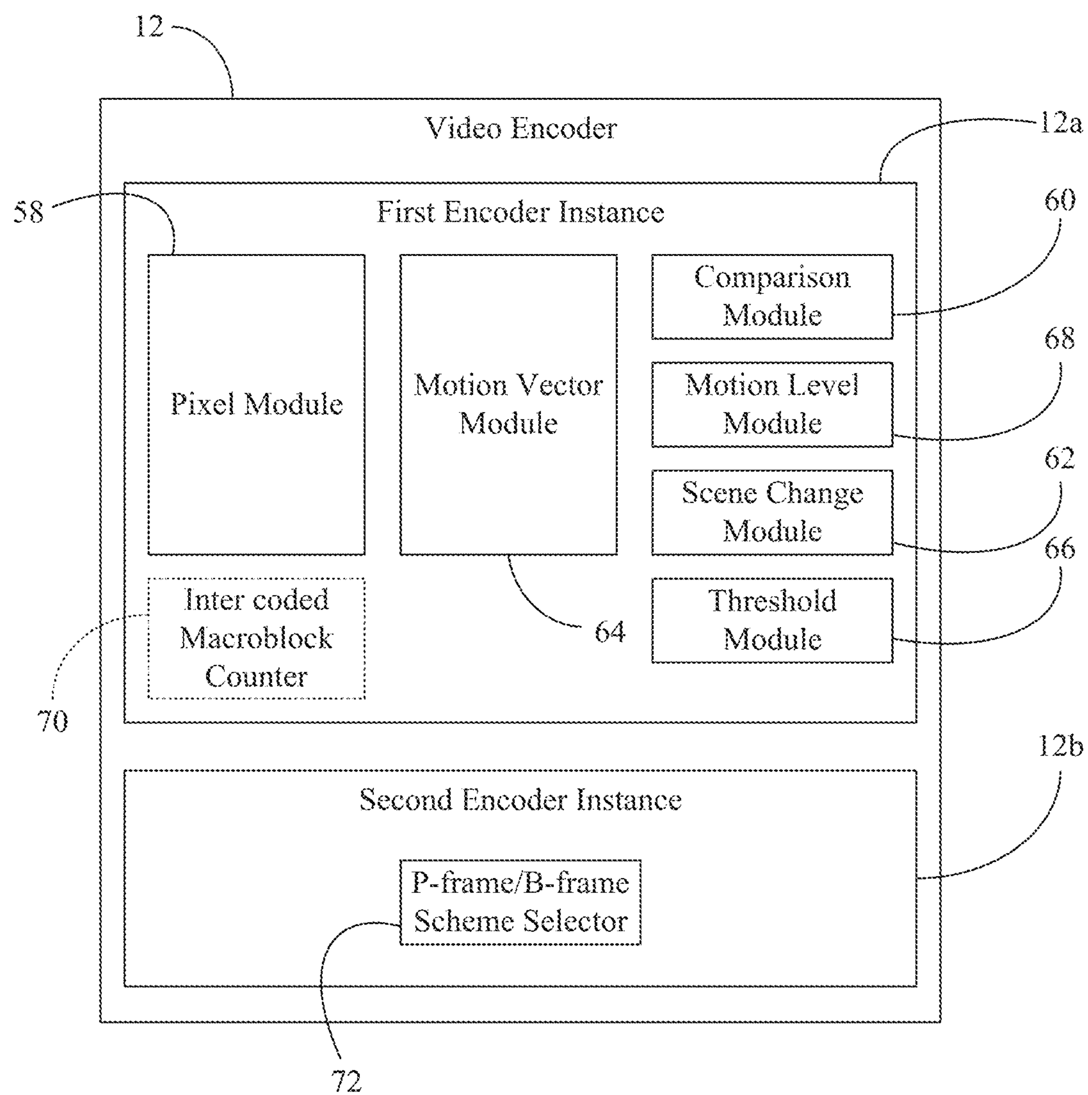
FIG. 4 is a block diagram of an example of a video encoder according to an embodiment.

FIG. 4 shows one example of the hardware video encoder 12 in greater detail. In the illustrated example, the first encoder instance 12*a* includes a pixel module 58 that adjusts total pixel values of frames in video content based on scene change thresholds to obtain adjusted pixel values. In one example, a threshold module 66 selects the scene change thresholds based on quantization parameters of the first encoder instance 12*a* and categories associated with the video content. The scene change threshold may also be selected externally to the video encoder (e.g., by programmable software). In addition, a comparison module 60 may conduct comparisons between encoded bit differences associated with frames in the video content and the adjusted pixel values. Moreover, a scene change module 62 may generate scene change determinations based on the comparisons made by the comparison module 60.

The illustrated first encoder instance 12*a* also includes a motion vector module 64 that determines average motion vectors for frames in the video content, wherein the comparison module 60 may conduct comparisons between the average motion vectors and scene change motion vector thresholds. The scene change module 62 may therefore also generate scene change determinations based on information originating from the motion vector module 64.

The pixel module 58 of the first encoder instance 12 may also adjust total pixel values of frames in the video content based on one or more motion level thresholds to obtain adjusted pixel values. In such a case, the comparison module 60 may conduct comparisons between encoded bit differences associated with frames in the video content and the adjusted pixel values, wherein a motion level module 68 may generate motion level determinations based on the comparisons.

The motion vector module 64 of the illustrated first encoder instance 12*a* also determines average motion vectors for frames in the video content. In such a case, the comparison module 60 may conduct comparisons between the average motion vectors and one or more motion level thresholds, wherein the motion level module 68 may generate motion level determinations based on information originating from the motion vector module 64. As already noted, if the first encoder instance 12*a* does not include a motion vector module 64 (e.g., motion vector information for the macroblock is not available), an inter coded macroblock counter 70 may be used to determine the level of motion in the video content based on the number of inter coded macroblocks encountered.

As already noted, the second encoder instance 12*b* may be used to encode video content based on the scene change and motion level determinations made by the first encoder instance 12*a*. More particularly, the second encoder instance 12*b* may include a P-frame/B-frame scheme selector to select P-frame/B-frame encoding schemes based on the motion level determinations.

Figure 5:
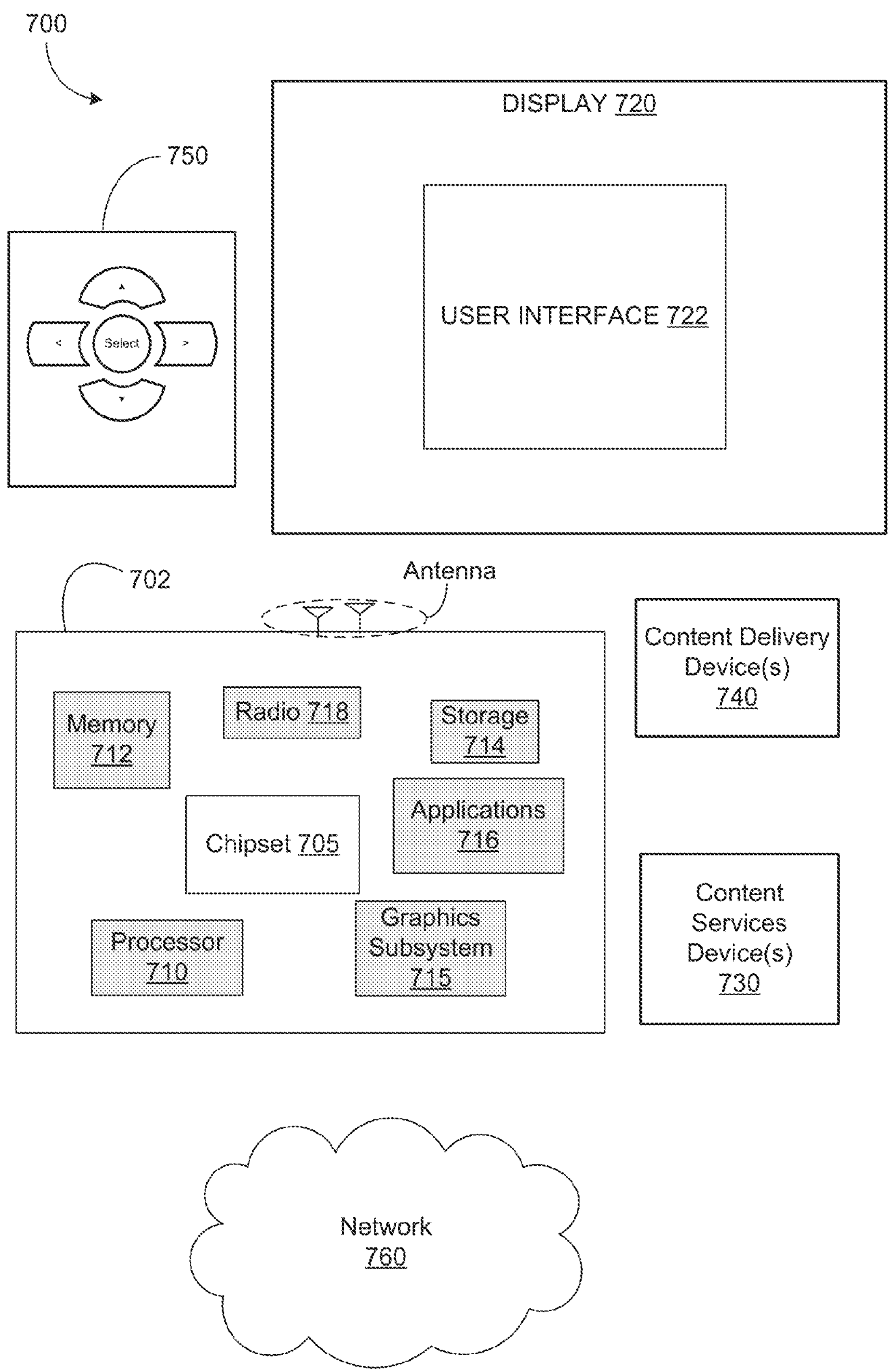
FIG. 5 is a block diagram of an example of a system having a navigation controller according to an embodiment.

FIG. 5 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth. Thus, the system 700 may be used to display video bitstreams as described herein.

In embodiments, the system 700 comprises a platform 702 coupled to a display 720. Platform 702 may receive video bitstream content from a content device such as content services device(s) 730 or content delivery, device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor (s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. The graphics subsystem 715 may therefore include the hardware video encoder 12 (FIGS. 1 and 4), already discussed. In addition, the processor 710 may be configured to implement methods such as, for example, the method 22 (FIG. 2) and/or the method 36 (FIG. 3), already discussed, via instructions obtained from the memory 712, the storage 714 or other suitable source. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NEC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
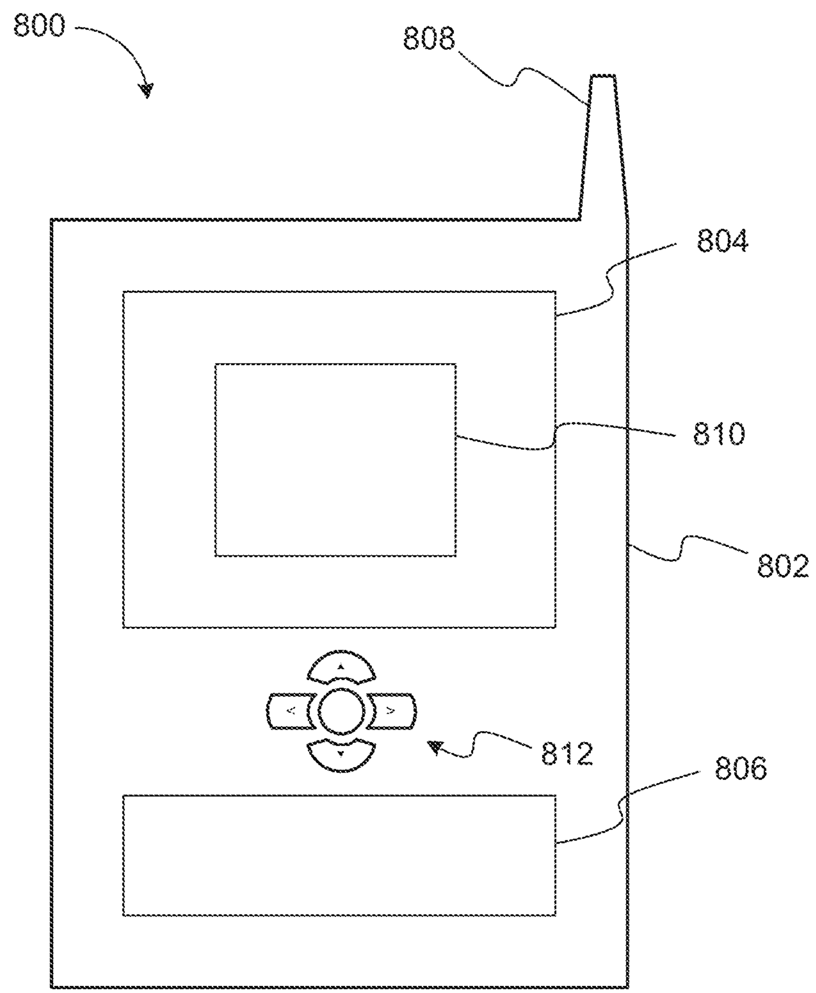
FIG. 6 is a block diagram of an example of a system having a small form factor according to an embodiment.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Thus, techniques described herein may be applied to camera recording applications in mobile devices in which there is a hardware encoder but no dedicated video pre-processing hardware. In such a case, the encoded video may have better visual quality at the same bit rate. Moreover, for live recording and broadcasting applications, coding efficiency can be substantially improved.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber hues, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:

invoking a first encoder instance of a video encoder to make a scene change determination with respect to video content, the first encoder instance:

adjusting a total pixel value of one or more frames in the video content based on a scene change threshold to obtain an adjusted pixel value;

conducting a comparison between an encoded bit difference associated with two or more frames in the video content and the adjusted pixel value; and generating the scene change determination based on the comparison; and invoking a second encoder instance of the video encoder to encode the video content based on the scene change determination.

2. The method of claim 1, further including using the second encoder instance to select an inter-prediction coded frame (P-frame) and bi-directional inter-prediction coded frame (B-frame) encoding scheme based on a motion level determination.

3. The method of claim 1, further including using the first encoder instance to encode frames of video content as one or more of intra coded frames (I-frames) and inter-prediction coded frames (P-frames).

4. A system comprising:

a battery to supply power to the system; and a video encoder including:

a first encoder instance to make a scene change determination with respect to video content, wherein the first encoder instance includes:

a pixel module having a scene change component to adjust a total pixel value of one or more frames in the video content based on a scene change threshold to obtain an adjusted pixel value;

a comparison module to conduct a comparison between an encoded bit difference associated with two or more frames in the video content and the adjusted pixel value; and a scene change module to generate the scene change determination based on the comparison; and a second encoder instance to encode the video content based on the scene change determination.

5. The system of claim 4, wherein the first encoder instance is to make a motion level determination with respect to the video content, and wherein the second encoder instance is to encode the video content further based on the motion level determination.

6. The system of claim 5, wherein the second encoder instance is to select an inter-prediction coded frame (P-frame) and bi-directional inter-prediction coded frame (B-frame) encoding scheme based on the motion level determination.

7. The system of claim 5, further including a motion level component to adjust a total pixel value of one or more frames in the video content based on one or more motion level thresholds.

8. The system of claim 5, wherein the first encoder instance includes:

a motion vector module having a motion level component to determine an average motion vector for one or more frames in the video content, wherein the comparison module is to conduct a comparison between the average motion vector and one or more motion level thresholds; and a motion level module to generate the motion level determination based on the comparison between the average motion vector and the one or more motion level thresholds.

9. The system of claim 4, further including a threshold module to select the scene change threshold based on a quantization parameter of the first encoder instance and a category associated with the video content.

10. The system of claim 4, wherein the first encoder instance includes a motion vector module having a scene change component to determine an average motion vector for one or more frames in the video content, wherein the comparison module is to conduct a comparison between the average motion vector and a scene change motion vector threshold, and wherein the scene change module is to generate the scene change determination based on the comparison between the average motion vector and the scene change motion vector threshold.

11. The system of claim 4, wherein the first encoder instance is to encode frames of the video content as one or more of intra coded frames (I-frames) and inter-prediction coded frames (P-frames).

12. A video encoder comprising:

a first encoder instance to make a scene change determination with respect to video content, wherein the first encoder instance includes:

a pixel module having a scene change component to adjust a total pixel value of one or more frames in the video content based on a scene change threshold to obtain an adjusted pixel value;

a comparison module to conduct a comparison between an encoded bit difference associated with two or more frames in the video content and the adjusted pixel value; and a scene change module to generate the scene change determination based on the comparison; and a second encoder instance to encode the video content based on the scene change determination.

13. The video encoder of claim 12, wherein the first encoder instance is to make a motion level determination with respect to the video content, and wherein the second encoder instance is to encode the video content further based on the motion level determination.

14. The video encoder of claim 13, wherein the second encoder instance is to select an inter-prediction coded frame (P-frame) and bi-directional inter-prediction coded frame (B-frame) encoding scheme based on the motion level determination.

15. The video encoder of claim 13, further including a motion level component to adjust a total pixel value of one or more frames in the video content based on one or more motion level thresholds.

16. The video encoder of claim 13, wherein the first encoder instance includes:

a motion vector module having a motion level component to determine an average motion vector for one or more frames in the video content, wherein the comparison module is to conduct a comparison between the average motion vector and one or more motion level thresholds; and a motion level module to generate the motion level determination based on the comparison between the average motion vector and the one or more motion level thresholds.

17. The video encoder of claim 12, further including a threshold module to select the scene change threshold based on a quantization parameter of the first encoder instance and a category associated with the video content.

18. The video encoder of claim 12, wherein the first encoder instance includes a motion vector module having a scene change component to determine an average motion vector for one or more frames in the video content, wherein the comparison module is to conduct a comparison between the average motion vector and a scene change motion vector threshold, and wherein the scene change module is to generate the scene change determination based on the comparison between the average motion vector and the scene change motion vector threshold.

19. The video encoder of claim 12, wherein the first encoder instance is to encode frames of the video content as one or more of intra coded frames (I-frames) and inter-prediction coded frames (P-frames).

20. A non-transitory computer readable storage medium comprising a set of instructions which, if executed by a processor, cause a computer to:

invoke a first encoder instance of a video encoder to make a scene change determination with respect to video content, the first video encoder to:

adjust a total pixel value of one or more frames in the video content based on a scene change threshold to obtain an adjusted pixel value;

conduct a comparison between an encoded bit difference associated with two or more frames in the video content and the adjusted pixel value; and generate the scene change determination based on the comparison; and invoke the second encoder instance of the video encoder to encode the video content based on the scene change determination.

21. The medium of claim 20, wherein the instructions, if executed, cause a computer to use the first encoder instance to make a motion level determination with respect to the video content, wherein the second encoder instance is to encode the video content further based on the motion level determination.

22. The medium of claim 21, wherein the instructions, if executed, cause a computer to use the second encoder instance to select an inter-prediction coded frame (P-frame) and bi-directional inter-prediction coded frame (B-frame) encoding scheme based on the motion level determination.

23. The medium of claim 21, wherein the instructions, if executed, cause a computer to use the first encoder instance to adjust a total pixel value of one or more frames in the video content based on one or more motion level thresholds.

24. The medium of claim 21, wherein the instructions, if executed, cause a computer to:

use the first encoder instance to determine an average motion vector for one or more frames in the video content;

use the first encoder instance to conduct a comparison between the average motion vector and one or more motion level thresholds; and use the first encoder instance to generate the motion level determination based on the comparison between the average motion vector and the one or more motion level thresholds.

25. The medium of claim 20, wherein the instructions, if executed, cause a computer to select the scene change threshold based on a quantization parameter of the first encoder instance and a category associated with the video content.

26. The medium of claim 20, wherein the instructions, if executed, cause a computer to:

use the first encoder instance to determine an average motion vector for one or more frames in the video content;

use the first encoder instance to conduct a comparison between the average motion vector and a scene change motion vector threshold; and use the first encoder instance to generate the scene change determination based on the comparison between the average motion vector and the scene change motion vector threshold.

27. The medium of claim 20, wherein the instructions, if executed, cause a computer to encode frames of the video content as one or more of intra coded frames (I-frames) and inter-prediction coded frames (P-frames).

28. A method comprising:

invoking a first encoder instance of a video encoder to make a scene change determination and a motion level determination with respect to video content, the first encoder instance:

adjusting a total pixel value of one or more frames in the video content based on one or more motion level thresholds to obtain an adjusted pixel value;

conducting a comparison between an encoded bit difference associated with two or more frames in the video content and the adjusted pixel value; and generating the motion level determination based on the comparison; and invoking a second encoder instance of the video encoder to encode the video content based on the scene change determination and the motion level determination.

29. A video encoder comprising:

a first encoder instance to make a scene change determination and a motion level determination with respect to video content, wherein the first encoder instance includes:

a pixel module having a motion level component to adjust a total pixel value of one or more frames in the video content based on one or more motion level thresholds to obtain an adjusted pixel value;

a comparison module to conduct a comparison between an encoded bit difference associated with two or more frames in the video content and the adjusted pixel value; and a motion level module to generate the motion level determination based on the comparison; and a second encoder instance to encode the video content based on the scene change determination and the motion level determination.

30. A non-transitory computer readable storage medium comprising a set of instructions which, if executed by a processor, cause a computer to:

invoke a first encoder instance of a video encoder to make a scene change determination and a motion level determination with respect to video content, the first encoder to:

adjust a total pixel value of one or more frames in the video content based on one or more motion level thresholds to obtain an adjusted pixel value;

conduct a comparison between an encoded bit difference associated with two or more frames in the video content and the adjusted pixel value; and generate the motion level determination based on the comparison; and invoke a second encoder instance of the video encoder to encode the video content based on the scene change determination and the motion level determination.

* * * * *